United States Patent Office 3,769,201
Patented Oct. 30, 1973

3,769,201
PLURAL STAGE REFORMING WITH A PALLADIUM CATALYST IN THE INITIAL STAGE
John H. Sinfelt, Berkeley Heights, Allan E. Barnett, Westfield, and James L. Carter, Chatham, N.J., assignors to Esso Research and Engineering Company
No Drawing. Filed May 27, 1971, Ser. No. 147,655
Int. Cl. C10g 39/00
U.S. Cl. 208—65                    19 Claims

ABSTRACT OF THE DISCLOSURE

A catalytic reforming process wherein naphtha feed streams, boiling from about 80 to 450° F., and comprising naphthenes, paraffins and aromatics, are contacted, in an initial reaction zone, with a hydrogen containing gas, in the presence of a catalyst comprising Pd, or Pd and a Group I-B metal supported on a refractory oxide, and passed into a tail zone wherein the feed stream is again contacted with a catalyst and thereby further reacted to produce a high octane number product. In a preferred embodiment the Group I-B metal is Au.

BACKGROUND OF THE INVENTION

(1) Field of the invention

This invention relates to a catalytic reforming process. More particularly this invention relates to reforming naphtha feed streams boiling from about 80 to 450° F. and comprising naphthenes, paraffins and aromatics in a two-step process wherein the feed stream is contacted in an initial reaction zone with a hydrogen containing gas in the presence of a catalyst comprising Pd, or Pd and a metal selected from Group I-B of the Periodic Table of the Elements, supported on a refractory oxide, then passed into a tail zone wherein the feed stream is again contacted with a catalyst and thereby further reacted, to produce a high octane number product. Preferably, the Group I-B metal is Au.

(2) Description of the prior art

Catalytic reforming is now a matter of record and commercial practice in this country. Basically, reforming involves the contacting of a naphtha fraction, either virgin, cracked, Fisher-Tropsch or any mixtures thereof, with a solid catalytic material. The catalyst is ordinarily a supported noble metal catalyst, such as platinum on alumina. Contacting takes place at elevated temperatures and pressures in the presence of added or recycled hydrogen. Hydrogen is essential since it suppresses the deactivation of the catalyst. The process itself produces substantial amounts of hydrogen, and in actuality this is the source of the hydrogen which is recycled to repress the deactivation of the catalyst; the deactivation of the catalyst is caused at least in part by carbon formation.

Reactions involved in catalytic reforming are: (1) dehydrogenation of naphthenes to the corresponding aromatic hydrocarbons such as cyclohexane dehydrogenation to benzene; (2) isomerization of normal paraffins to branched-chain paraffins or isomerization of ring compounds, such as ethylcyclopentane to methylcyclohexane, which latter compound readily dehydrogenates to form toluene; (3) dehydrocyclization of paraffins to aromatics, e.g., n-heptane to toluene; and (4) hydrocracking of the higher boiling constituents.

Fixed bed catalytic reforming processes may be divided into three general classes: non-regenerative, semi-regenerative and cyclic. The three processes differ most significantly in that the cyclic has an alternate or swing reactor which is so manifolded that it may replace any reactor within the system in order that the replaced reactor may be regenerated. The instant invention is intended to include all classes of reforming.

A great variety of catalysts for catalytically reforming a naphtha feed stream is known; perhaps the best known of these catalysts is platinum dispersed upon a highly purified alumina support such as one may obtain from aluminum alcoholate. Such a catalyst is described in detail in U.S. Pat. 2,636,865, the disclosure of which is herein incorporated by reference. Other members of the platinum group such as palladium or rhodium may be utilized, but platinum is much preferred. The alumina support should have a high surface area, greater than 50 m.$^2$/gm. It should also have acidic properties, and hence must be substantially free of alkaline impurities.

The reforming system can be considered to consist of two separate reaction zones. In the initial zone, naphthene dehydrogenation and isomerization are the primary reactions. In the tail zone, dehydrocyclization and hydrocracking reactions occur predominantly.

It is noted that commercial reforming systems can be composed of three to four reactor units in series. These units will together comprise both the initial reaction zone and the tail zone. It is to be understood that in the process of this invention the first 1, 2 or 3 reactors can comprise the initial reaction zone and the remaining reactor or reactors can comprise the tail zone. It has been generally thought that the Pt-alumina catalyst is the best available for the reactions occurring in the initial zone, and attempts to improve the efficiency of naphtha reforming processes have centered on finding catalysts with improved efficiency for the reactions occurring in the tail zone. In actual practice with platinum-alumina catalyst, a substantial fraction of the alkylcyclopentanes which are present in the naphtha feed undergoes hydrogenolysis or hydrocracking reactions in the initial reaction zone, thus limiting the selectivity of conversion of the alkylcyclopentanes to the desired high octane number aromatic products.

In a copending application, Ser. No. 102,208, filed in the name of J. L. Carter and J. H. Sinfelt, an improved process for reforming naphtha is described. In said process a Pt-Group I-B catalyst is utilized in the initial reforming zone to improve the selectivity of the conversion of alkylcyclopentanes to aromatics.

SUMMARY OF THE INVENTION

It has now been unexpectedly found that the substitution of Pd or a Pd-Group I-B bimetallic catalyst for the Pt catalysts known in the art, in the initial reaction zone of a reforming process, greatly increases the selectivity of conversion of alkylcyclopentanes to high octane number aromatic products.

The catalyst of this invention comprises Pd or Pd and a Group I-B metal on a refractory oxide support. The Group I-B metal is preferably Au and the support is preferably selected from the group consisting of alumina, silica-alumina, crystalline aluminosilicates, and halogen containing alumina. The support is usually acidic and has a high surface area, e.g. 50 to 300 m.$^2$/g. The support may also contain small amounts of halogen, i.e. Cl and F, for added acidity. This halogen may be added to the support in the catalyst preparation, or it can be added to the catalyst in situ in the reactor.

The Pd metal comprises about 0.05 to 2.0 wt. percent of the total catalyst, preferably 0.1 to 1.0 wt. percent and most preferably 0.25 to 0.75 wt. percent. When the catalyst is bimetallic, i.e., Pd+Group I-B metal, the weight percent of Pd is as hereinbefore defined, and the Group I-B metal will comprise 0.05 to 2.0 wt. percent of the total catalyst. In the case of gold, the amount would be preferably 0.1 to 2.0 wt. percent and most preferably 0.25 to 1.5 wt. percent. The remaining catalyst weight is supplied by the support and/or halogen. Halogen may vary from 0 to 2.0 wt. percent, preferably from 0.3 to 1.2 wt. percent of the total catalyst.

The catalyst may be prepared by impregnating the support with a soluble palladium salt or a combination of soluble palladium and Group I–B metal salts. A preferred method for preparing the palladium catalyst is to impregnate the support with an aqueous solution of $$(NH_4)_2PdCl_2$$

When the preferred bimetallic catalyst is desired, a solution of $(NH_4)_2PdCl_2$ and $HAuCl_4 \cdot 3H_2O$ may be used.

While not wishing to be bound by theory, it is believed that the increased selectivity of conversion of alkylcyclopentanes to high octane number aromatic products is due to the lower hydrogenolysis activity of Pd and Pd+Group I–B bimetallic catalyst as compared to Pt catalyst. The result is that the utilizatin of a Pd or Pd-Group I–B bimetallic catalyst in the initial zone of a reforming process gives a greater yield of high octane number product than the conventional reforming process wherein a Pt catalyst is used throughout. This result is unexpected because it is known in the prior art that Pd is inferior to Pt when Pd catalyst is used throughout the reforming system.

The feed streams which can be successfully treated by the process of this invention include naphthas. A naphtha feed stream is a petroleum fraction boiling between about 80 and 450° F., preferably between 120 and 400° F., and contains paraffinic, naphthenic and aromatic hydrocarbons. In general the naphtha feed stream will contain about 15 to 75% by weight paraffins, about 15 to 75% by weight naphthenes and about 2 to 20% aromatics.

In the process of this invention, the naphtha feed stream will contain 0 to 15 wt. percent naphthenes upon leaving the initial reaction zone, preferably 0 to 5 wt. percent with the remainder consisting of aromatics and paraffins. With the description of the novel process of this invention, it will be possible for the skilled artisan to design a reforming system to give the maximum yield of high research octane number product from any suitable feed stream.

Reaction conditions within both the initial reaction zone and the tail zone may vary widely. Pressure for instance, may vary between 0 and 900 p.s.i.g., preferably between 15 and 600 p.s.i.g., nad most preferably between 50 and 500 p.s.i.g. Temperature may vary between 600 and 1050° F., preferably between 750 and 1000° F., and most preferably between 780 and 980° F. The temperature and the pressure chosen will of course be a function of the particular feed stream utilized.

Hydrogen is circulated or recycled through the initial reaction zone and the tail zone at a rate of 0 to 15,000 standard cubic feet (s.c.f.) per barrel (bbl.), preferably 1,000 to 10,000 standard cubic feed per barrel and most preferably 2,000 to 6,000 standard cubic feet per barrel of liquid naphtha feed.

The space velocity, which is expressed as weight in pounds of feed charged per hour per lb. of catalyst, depends upon the activity level of the catalyst, the character of the feed stock and the desired octane number of the product. Ordinarily it may vary from about 0.2 w./hr./w. to 20 w./hr./w., preferably from about 0.5 w./hr./w. to about 10 w./hr./w. and most preferably from about 1 to 5 w./hr./w. based on the total catalyst in the system.

It is preferred to use the catalyst in the form of pellets or extrudates which are preferably $\frac{1}{16}$ to $\frac{1}{4}$ inch in diameter.

In a preferred embodiment of the instant invention a train of four catalytic reforming reactors is utilized. The third and fourth reactors, i.e., the tail zone, contain a catalyst comprising platinum on an alumina support. The catalyst comprises about 0.1 to 1.0 wt. percent of platinum and the remainder alumina and halogen, the latter ranging from 0 to 2.0 wt. percent. The catalyst is prepared by impregnation of the alumina with an aqueous solution of chloroplatinic acid. It is then dried at about 220–250° F. and subsequently calcined in air at 400–1100° F. The finished catalyst is formed into pellets of about $\frac{1}{8}$-inch size and charged to the reforming reactors. In the first two reactors, i.e., the initial reaction zone, there is the catalyst of the instant invention, which comprises either about 0.6 wt. percent Pd or 0.6% Pd, 0.3% Au on alumina. The finished catalyst is used in the form of $\frac{1}{8}$-inch cylindrical pellets or extrudates of similar size. The amount of catalyst charged to the first two reactors is about 25 to 75 wt. percent of the total catalyst employed in all the reactors. Feed stream is a naphtha cut boiling between about 120 and 400° F. which comprises about 15 to 75 wt. percent paraffins, about 15 to 75 wt. percent naphthenes, and about 2 to 20 wt. percent aromatics; weight hourly space velocity of naphtha feed is 0.5 to 10 pounds of feed per hour per pound of total catalyst in the system. Reactor temperatures and pressures are in the range of 700 to 1000° F. and 100 to 500 p.s.i.g., respectively. The hydrogen recycle gas rate is 1000 to 10,000 standard cubic feet per barrel of naphtha feed. The product issuing from the first two reactors contains about 2 to 15 wt. percent naphthenes, the remainder comprising paraffins, both normal and iso, and aromatics. After passage through the third and fourth reactors containing the platinum catalyst, the product is separated into two fractions, one containing $C_5$ and higher molecular weight hydrocarbons and the other $C_4$ and lower molecular weight hydrocarbons. The $C_5+$ fraction contains 60 to 80 wt. percent aromatics, or higher, with research clear octane numbers in the range of 90 to 105, or higher.

SPECIFIC EMBODIMENTS

EXAMPLE 1—CONVERSION OF NAPHTHENES TO AROMATICS

This example demonstrates the superior ability of the catalysts of the instant invention to convert alkylcyclopentanes to aromatics. A model compound, methylcyclopentane, was converted to benzene using a Pd or Pd-Au bimetallic catalyst and a standard Pt catalyst. This experiment demonstrates an important reaction occurring in the initial reaction zone of a catalytic reforming process.

REACTION CONDITIONS

Temperature—850° F.
Pressure—200 p.s.i.g.
$H_2$/methylcyclopentane mol ratio=5
Feed—Methylcyclopentane

| Run | Catalyst composition | Percent conversion | Selectivity to benzene |
|---|---|---|---|
| A | 0.6% Pd, 0.3% Au on alumina | a 25.7 | a 69.4 |
| B | 0.6% Pd on alumina | b 21.6 | b 57.2 |
| C | 0.6 wt. percent Pt on alumina | 18.7 | 26.2 |
| D | 0.6 wt. percent Pt on alumina | 36.1 | 24.9 | a Average of 3 reaction periods.
b Average of 4 reaction periods.

Preparation of the catalysts utilized in Example 1

In the preparation of the palladium and palladium-gold catalysts $\frac{1}{16}$ inch alumina extrudates were impregnated with aqueous solutions of $(NH_4)_2PdCl_2$ and of $$(NH_4)_2PdCl_2$$

plus $HAuCl_4 \cdot 3H_2O$, respectively. Approximately 1.5 ml. of impregnating solution per gram of alumina was employed. The catalysts were dried overnight at 220° F. prior to being charged to the reactor. The platinum-alumina catalyst was a commercial reforming catalyst prepared by impregnating alumina with chloroplatinic acid.

Note the catalysts utilized in the process of the instant invention show selectivities of conversion of methylcyclopentane to benzene which are at least twice that of the prior art catalyst. This result holds even at low conversions where the prior art catalyst would be expected to give optimum selectivity. The reforming process of the instant invention thus gives increased yields of high octane products as compared to a conventional reforming process.

When Ag or Cu is substituted for Au in Run A, similar resuts are obtained in that the selectivity of conversion of methylcyclopentane to benzene is greater than that with the standard catalyst described in Runs C and D.

EXAMPLE 2—NAPHTHA REFORMING

In this example a naphtha feed stream is reformed in a two-stage system in which the first stage contains a 0.6% palladuim on alumina catalyst or a catalyst comprising 0.6% palladium plus 0.3% gold on alumina. The naphtha feed has the following characteristics:

Boiling range: 190–315° F.
Research octane No.: 55.7
Percent paraffins: 46.4
Percent naphthenes: 32.7
Percent aromatics: 16.7

The reforming conditions are:

Temperature: 800–940° F.
Pressure: 150–250 p.s.i.g.
Space velocity: 1–3 w./hr./w.
Recycle gas rate: 2000–4000 s.c.f./b.

The reaction product has a research octane number of 80 to 85. This material is then processed over a conventional platinum-alumina catalyst in a second stage at temperatures of 900–975° F. to yield a $C_5+$ product with a research octane number of 98 or higher.

What is claimed is:

1. A reforming process comprising contacting a hydrocarbon feedstock and hydrogen in an initial reaction zone at reforming conditions with a catalyst, said catalyst consisting essentially of palladium and halogen or palladium, a metal selected from Group I–B of the Periodical Table of the Elements and halogen contained on a refractory oxide support and subsequently contacting the said hydrocarbon feedstock and hydrogen and a tail reaction zone at reforming conditions with a catalyst comprising platinum and halogen on alumina.

2. The process of claim 1, wherein the hydrocarbon feed stream is a naphtha stock boiling in the range of 80° to 450° F. and comprising paraffins, naphthenes, and aromatics.

3. The process of claim 1, wherein the refractory oxide support is selected from the group consisting of alumina, silica-alumina, acid treated alumina, and crystalline aluminosilicates.

4. The process of claim 1, wherein the Group I–B metal is Au.

5. The process of claim 1 wherein said initial reaction zone catalyst is palladium and halogen contained on a refractory oxide support.

6. The process of claim 1 wherein said initial zone catalyst is palladium, a Group I–B metal and halogen contained on a refractory oxide support.

7. The process of claim 1 wherein said refractory oxide support of said initial zone catalyst is alumina.

8. The process of claim 1 wherein the halogen component of said initial and tail zone catalysts is chlorine.

9. A reforming process comprising contacting a naphtha feedstock boiling between about 80° and 450° F. in an initial reaction zone with a catalyst in the presence of hydrogen, said catalyst consisting essentially of palladium and halogen or palladium, a metal selected from Group I–B of the Periodic Table of the Elements and halogen contained on a refractory oxide support and subsequently contacting the said naphtha feedstock and hydrogen in a tail reaction zone with a catalyst comprising platinum and halogen on alumina, said contacting in said initial and tail reaction zones being conducted at a pressure varying between about 50 and 500 p.s.i.g. and at a temperature varying between 750° and 1000° F.

10. The process of claim 9 wherein said naphtha feedstock comprises from about 15 to 75 wt. percent naphthenes, 15 to 75 wt. percent paraffins and about 2 to 20 wt. percent aromatics.

11. The process of claim 9 wherein said initial zone and tail zone catalysts contain from about 0.3 to 1.2 wt. percent halogen.

12. The process of claim 11 wherein said halogen is chlorine.

13. The process of claim 9 wherein said initial zone catalyst comprises chlorine and palladium on alumina, said pallladium comprising 0.01 to 1.0 wt. percent of the total catalyst.

14. The process of claim 9 wherein said initial zone catalyst is chlorine, palladium and a metal selected from Group I–B of the Periodic Table of the Elements on alumina, the palladium comprising 0.1 to 1.0 wt. percent and the Group I–B metal comprising 0.05 to 2.0 wt. percent of the total catalyst.

15. The process of claim 14 wherein said Group I–B metal is gold.

16. A process for catalytically reforming a naphtha feedstock boiling between about 120° and 400° F. and containing from about 15 to 75 wt. percent paraffins, 15 to 75 wt. percent naphthenes and about 2 to 20 wt. percent aromatics which comprises contacting said feedstock and hydrogen in an initial reaction zone with a catalyst consisting essentially of palladium and chlorine contained on alumina or palladium and a metal selected from Group I–B of the Periodic Table of the Elements and chlorine contained on alumina to obtain a product containing from 0 to 15 wt. percent naphthenes, passing said product from said initial reaction zone to a tail reaction zone and contacting said product and hydrogen therein with a catalyst comprising platinum and chlorine on alumina, said contacting in said initial reaction zone and said tail reaction zone being conducted at a pressure varying from about 50 and 500 p.s.i.g. and at a temperature varying from about 780° and 980° F.

17. The process of claim 16 wherein said Group I–B metal is gold.

18. The process of claim 16 wherein said initial zone catalyst comprises chlorine and palladium on alumina, said palladium comprising 0.01 to 1.0 wt. percent of the total catalyst.

19. The process of claim 16 wherein said intial zone catalyst is chlorine, palladium and a metal selected from Group I–B of the Periodic Table of the Elements on alumina, the palladium comprising 0.1 to 1.0 wt. percent and the Group I–B metal comprising 0.05 to 2.0 wt. percent of the total catalyst.

References Cited

UNITED STATES PATENTS

| | | | |
|---|---|---|---|
| 2,911,357 | 11/1959 | Myers et al. | 208—138 |
| 3,442,973 | 5/1969 | Sinfelt et al. | 252—474 |
| 3,562,346 | 2/1971 | Smirnov et al. | 208—138 |
| 3,173,856 | 3/1965 | Burton et al. | 208—138 |
| 3,091,584 | 5/1965 | Singer | 208—65 |
| 3,347,777 | 10/1967 | Davis | 208—65 |

HERBERT LEVINE, Primary Examiner

U.S. Cl. X.R.
208—139; 252—474